United States Patent [19]

Shriver

[11] Patent Number: 5,333,518
[45] Date of Patent: Aug. 2, 1994

[54] SAW BLADE SHARPENING APPARATUS

[76] Inventor: Earl Shriver, 502 Barclay, Dewey, Okla. 74029

[21] Appl. No.: 76,955

[22] Filed: Jun. 16, 1993

[51] Int. Cl.$^5$ .............................................. B23D 63/12
[52] U.S. Cl. ............................................ 76/40; 76/77
[58] Field of Search ........................... 76/37, 40, 75, 77

[56] References Cited

U.S. PATENT DOCUMENTS

| | | |
|---|---|---|
| 458,205 | 8/1891 | Wheeler . |
| 1,130,112 | 3/1915 | Schmidt . |
| 1,508,588 | 9/1924 | Black . |
| 1,530,378 | 3/1925 | Lanfranchi . |
| 2,490,244 | 12/1949 | Wahlstrom . |
| 2,590,992 | 4/1952 | McEwan . |
| 2,607,243 | 8/1952 | McEwan . |
| 2,729,987 | 1/1956 | Bluemink . |
| 3,066,552 | 12/1962 | Gavin ................................ 76/40 |
| 3,657,946 | 4/1972 | Idel et al. . |
| 4,023,446 | 5/1977 | Annas et al. ...................... 76/40 |

FOREIGN PATENT DOCUMENTS 447575  8/1912  France .

*Primary Examiner*—Roscoe V. Parker
*Attorney, Agent, or Firm*—Head & Johnson

[57] ABSTRACT

A saw blade sharpening apparatus for sharpening an elongated blade having a plurality of aligned cutting teeth. The apparatus includes a grinder mechanism to sharpen the teeth. The grinder includes a body and a rotating grindstone, the grindstone having an axis aligned with the blade. The rotating grindstone continuously circulates in a rotational pattern to move the grindstone across the surface of one of the teeth to grind the entire surface of the tooth. At the same time, the rotating grindstone advances the blade linearly from the tooth being ground to the next tooth in succession.

10 Claims, 3 Drawing Sheets

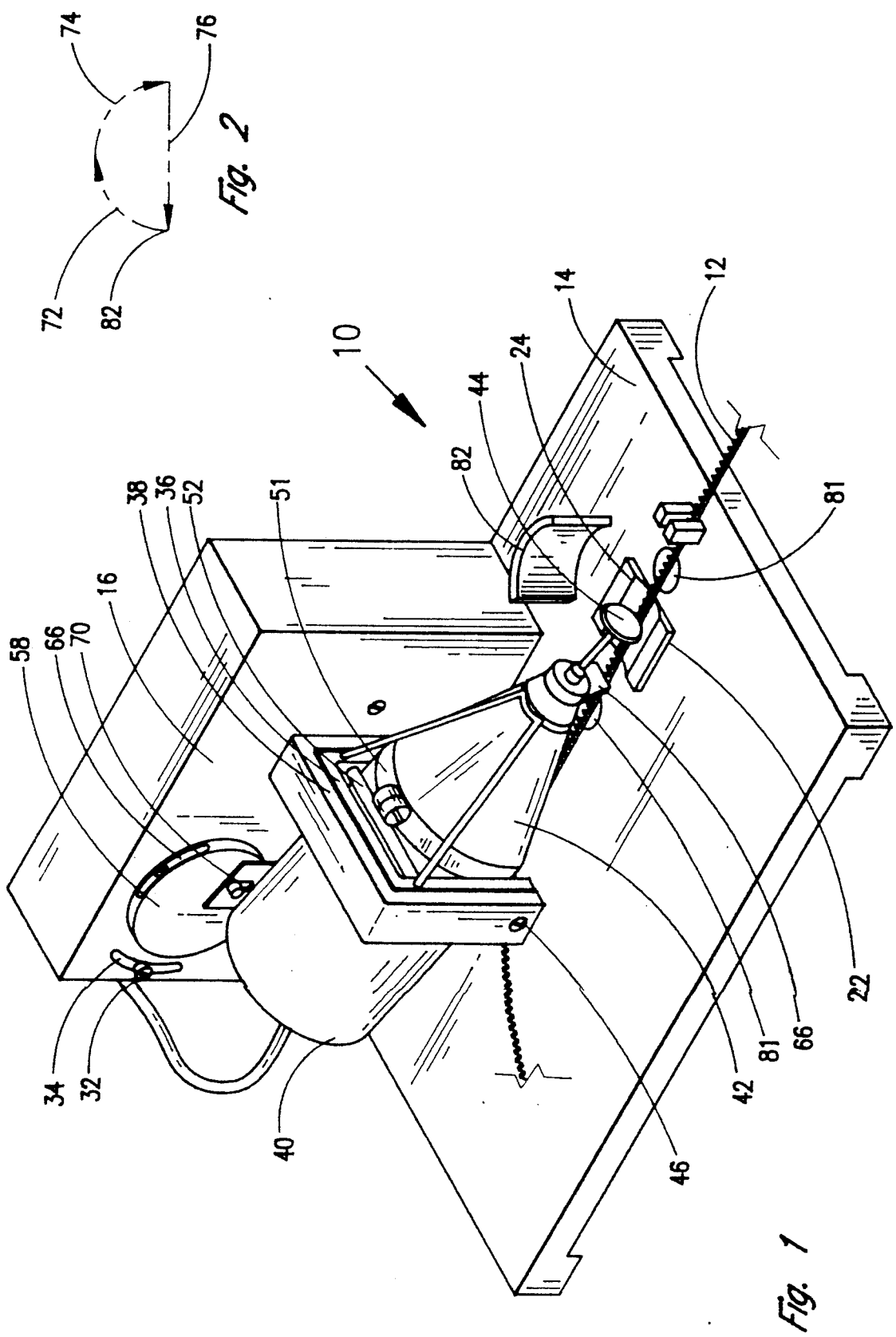

SAW BLADE SHARPENING APPARATUS

BACKGROUND OF THE INVENTION

1. Field of the Invention

The present invention is directed to a saw blade sharpening apparatus for sharpening the teeth of a saw blade. In particular, the present invention is directed to a saw blade sharpening apparatus for a band saw blade to grind the entire surface of each tooth and, at the same time, linearly advance the blade to the next tooth in succession.

2. Prior Art

Saw blades after a period of use must be sharpened to cut efficiently. If they are not sharpened, they work inefficiently. A dull saw blade will cut much slower even with more pressure applied to the work piece. By simply applying more pressure to the work piece, there is an increased chance of breakage of the saw blade.

Sharpening the saw blade by sharpening each tooth of the saw blade individually is a slow, painstaking process. As an example, a bandsaw blade may have a length of from five to 18 feet and have from two to 16 teeth per inch. A need exists, therefore, for a sharpening device that not only sharpens the entire surface of the tooth, but, at the same time, will advance the saw blade to the next tooth.

It is, therefore, a principal object and purpose of the present invention to provide a saw blade sharpening apparatus that will travel across the entire surface of each tooth and, at the same time, advance the saw blade to the next tooth.

It is an additional object and purpose of the present invention to provide a saw blade sharpening apparatus having a grinder mechanism that travels in both radial arc motion and straight line motion.

It is a further object and purpose of the present invention to provide a saw blade sharpening apparatus that is adjustable to sharpen saw blades having differing width and teeth spacing.

SUMMARY OF THE INVENTION

The present invention provides a saw blade sharpening apparatus for sharpening an elongated blade having an elongated, long thin strip of metal with a plurality of aligned saw or cutting teeth along one edge. The apparatus includes a base plate having a vertically extending main support plate extending therefrom.

The vertical main support plate is juxtaposed between a pair of parallel vertical rails. A pin may be received through an aperture in the rails and an opening in the main support plate to provide a height adjustment. The height adjustment feature accommodates bandsaw blades having different widths.

Additionally, the height adjustment feature is used to raise the grindstone away from the blade when inserting a different band saw blade.

The base plate also has a recess or cavity to receive and hold the blade guide block. Having a slot cut lengthwise through the block to support the blade in a vertical position to the base.

A motion drive motor is mounted to a sub-plate attached to the main support plate at two points: a front connection and a rear post connection so that the sub-plate may be positioned upward or downward to allow the motor upward or downward adjustment. This alters the rake angle at which the grindstone grinds the teeth of the bandsaw.

An inner U-shaped bracket and an outer U-shaped bracket support a grinder mechanism which includes a body extending longitudinally and a rotating grindstone having an axis aligned with the blade. The inner U-shaped bracket resides within and is connected to the outer U-shaped bracket by a pair of pins which extend through openings at the open ends of the U-shaped brackets. The inner U-shaped bracket, thus, permits a rocking action or an inverted pendulum action about the pins. A motion drive bracket is securely attached to the grinder mechanism by use of a clamp. A shaft bearing is perpendicular to the axis of the grindstone and is received in openings in the inner U-shaped bracket. The shaft bearing is welded or otherwise attached to the motion drive bracket.

A motor shaft on the motion drive motor causes the grindstone to move in a rotational pattern. A variable throw crank includes a metal disk which is attached and perpendicular to the motor shaft. The metal disk is mounted slightly off center or offset from the motor shaft. The metal disk is surrounded by a circular metal cap. Extending from the metal cap is a drive crank stud which is offset from the center point of the cap, an equal amount as the metal disk offset. When the drive crank stud is aligned with the drive motor shaft, the drive crank will have zero throw. The metal cap has a slot along the edge. Rotating and clamping the cap with respect to the metal disk will cause the drive crank stud to have a throw displacement for each motor revolution.

Extending from the body of the grinder mechanism is an optional extending pawl. The pawl will act to advance the saw blade in the event that a tooth is missing under the grindstone.

BRIEF DESCRIPTION OF THE DRAWINGS

FIG. 1 is a perspective view of a saw blade sharpening apparatus constructed in accordance with the present invention;

FIG. 2 is a diagrammatic depiction of the continuous circulation of the rotating grindstone included in the saw blade sharpening apparatus shown in FIG. 1;

DETAILED DESCRIPTION OF THE PREFERRED EMBODIMENT

Figure 3:
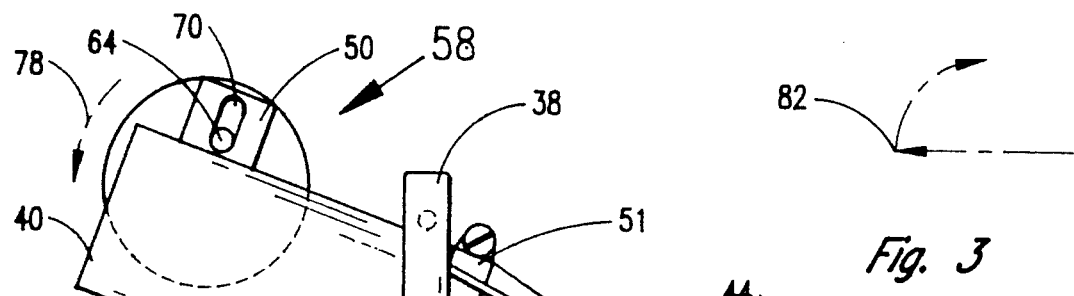
FIGS. 3, 4, 5 and 6 illustrate the sequential movement of the rotating grindstone turning one complete cycle of the saw blade sharpening apparatus shown in FIG. 1.

Referring to the drawings in detail, FIG. 1 illustrates a perspective view of a saw blade sharpening apparatus 10 for sharpening an elongated blade such as a band saw blade 12. The band saw blade 12 is an elongated, long, thin strip of metal with a plurality of aligned saw or cutting teeth along one edge. The ends of the blade are welded or formed together to form an endless or continuous saw blade.

In FIG. 1, only a portion of the band saw blade 12 is visible with the rest cut away. The band saw blades vary in length from five feet to approximately 15 feet and can have anywhere from two to 16 teeth per inch. The present invention has been found to be valuable, not only with worn blades, but with new blades as well. It has been found that blades sharpened with the present invention cut better than new band saw blades because the band saw teeth when manufactured are typically stamped out and have never been ground to a sharp edge.

Figure 7:
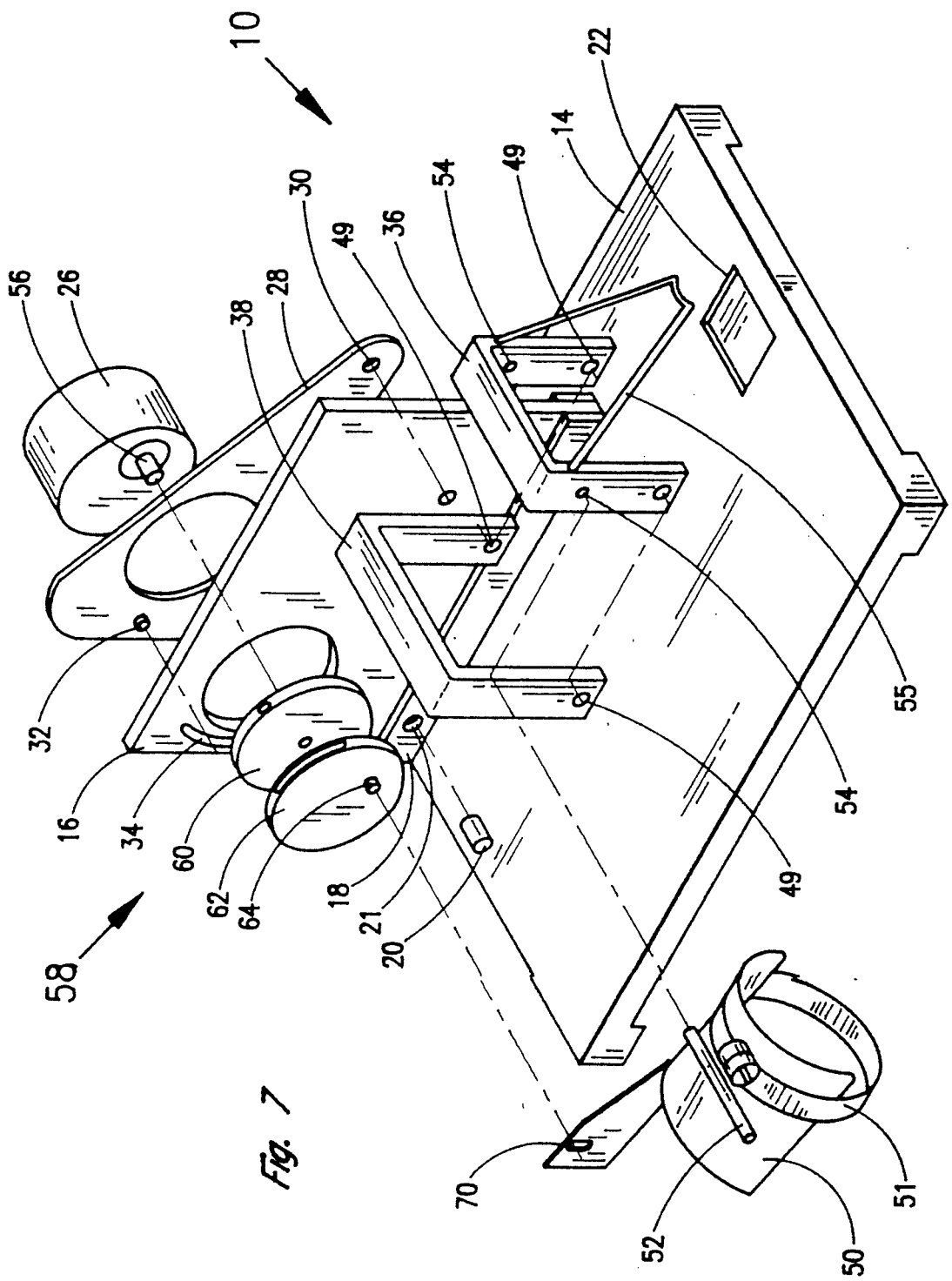
FIG. 7 is an exploded view of some of the elements of the saw blade sharpening apparatus shown in FIG. 1.

FIG. 7 is an exploded view of some of the components of the apparatus 10. With reference to FIG. 7 and continuing reference to FIG. 1, the apparatus includes a base plate 14 having a vertically extending main support plate 16 extending therefrom. The vertical main support plate 16 may be held in place by a pair of parallel vertical rails 18, one of which is visible in the exploded view in FIG. 7. The vertical main support plate is juxtaposed between the rails and has a height adjustment through use of a pin 20 which may be received through an aperture 21 in the rails and an opening in the main support plate. The height adjustment feature may be utilized to accommodate band saw blades having different widths. In the present embodiment, the apparatus may be adjusted to accommodate blades having widths of ⅛" to ½". The height adjustment feature may also be used to raise the grindstone away from the blade when inserting a different band saw blade.

The base plate 14 also has a rectangular recess or cavity 22 which is used to receive and hold a blade guide block 24. The guide block may be composed of hardwood or other material and has a slot cut lengthwise through the block. The slot serves to support the band saw blade 12 in a position vertical to the base plate 14 so that the teeth are facing up.

An optional magnet 82 may be placed on the baseplate which serves to attract and catch filings ground from the blade. Additionally, magnets 81 may be placed in or under the baseplate in line with the travel of the blade to keep the blade from bouncing, thereby stabilizing the blade.

The main support plate 16 also acts as a mounting surface for other elements of the apparatus. A motion drive motor 26 is mounted to a sub-plate 28. The sub-plate is attached to the main support plate 16 on the motor side of the main support plate at two points, a front connection 30 and a rear post connection 32 which is received in an arcuate slot 34 of the main plate. The sub-plate may, thus, be positioned upward or downward to allow the motor 26 upward or downward adjustment. As will be described below, adjustment of the sub-plate alters the rake angle at which the grindstone which grinds the teeth of the band saw.

The rake angle is measured in plus degrees or minus degrees and indicates whether the top point of the tooth is in front (plus) or behind (minus) the vertical plane of the tooth. Stated another way, the rake angle measures whether the teeth are leaning into or away from the cut.

An inner U-shaped bracket 36 and an outer U-shaped bracket 38 are utilized to support a grinder mechanism 40. The grinder includes a body 42 extending longitudinally and a rotating grindstone 44 having an axis aligned with the blade 12. The outer U-shaped bracket is the larger of the two and is mounted open end down to the main support plate 16, on the side of the main support plate opposite the motion drive motor 26. The inner U-shaped bracket resides within and is connected to the outer U-shaped bracket by a pair of pins 46 and 48 that extend through openings 49 at the open ends of the U-shaped brackets. The inner U-shaped bracket thus forms an inverted pendulum swinging about the pins 46 and 48.

A motion drive bracket 50 is securely attached to the grinder mechanism 40. This may be accomplished by use of a clamp 51. A shaft bearing 52 attached to the motion drive bracket extends perpendicular to the axis of the grindstone. The shaft bearing is received in openings 54 in the inner U-shaped bracket 36.

Additionally, a spring 55 extends outward from the inner U-shaped bracket and rests against the body of the grinder 40. This spring 55 provides a constant downward force on the grinder 40.

Returning to a consideration of the motion drive motor 26, in the present embodiment a motor shaft 56 passes through a gear reduction and represents the output of the gear reduction. The motion drive motor 26 causes the grindstone 44 to move in a rotational pattern to be described herein. Each full rotation of the motor shaft 56 results in one circulation of the grindstone across one tooth. The speed of the motion drive motor 26 dictates the speed that the band saw blade is advanced through the sharpener. In one embodiment, the motion drive motor 26 operates at 150 revolutions per minute which equates to 150 teeth per minute that are sharpened.

A variable throw crank 58 includes a metal disk 60 which is attached and perpendicular to the motor shaft 56 of the motion drive motor 26. The metal disk 60 is mounted slightly off center to the motor shaft 56. The metal disk 60 is surrounded by a circular metal cap 62. Extending from the metal cap is a drive crank stud 64. The drive crank stud is attached off center from the center point of the cap. When the drive crank cap stud is aligned with the drive motor shaft 56, the drive crank stud 64 will have zero additional throw.

The metal cap has a slot 66 along one edge. Rotating and clamping the cap with respect to the metal disk will cause the drive crank stud 64 to have a throw displacement for each motor revolution. In one embodiment, the drive crank stud 64 will have throw displacement of ⅝" for each motor revolution. This arrangement multiplies the 5/32" offset four times by variation of the metal cap, any throw can be obtained from zero to ⅝" by rotating the metal cap in relation to the metal disk 60.

As will be appreciated from the foregoing, the motion drive motor 26 does not drive the grindstone mechanism and only drives the grinder through the action shown in FIG. 2.

The motorized grinder in the present embodiment is a hand-held grinder, which is well known. The grinder 40 can be single speed or a variable speed grinder. In the present embodiment, the grindstone is ¾" in diameter, ⅛" thick with a bevel shape. This shape closely resembles the profile of a band saw blade.

It will be appreciated that grindstones having other configuration may be utilized to work with band saw blades having other tooth configurations.

Extending from the body 40 of the grinder (the small end) is an optional extending pawl 66.

The pawl will not move the blade during ordinary operation of the apparatus. If a tooth is broken or missing at the grindstone, the pawl will engage and forward the blade.

In order to utilize the saw blade sharpening apparatus 10, the variable throw crank 58 is set for the proper number of teeth per inch for the band saw blade to be sharpened. As an example, the variable throw crank may be caused to have a throw displacement of ⅝". Stated another way, the space between each tooth point of the blade equals ⅝". Once the variable throw crank has been set to the proper setting, the motion drive motor 26 may be initiated. This motor may be an electrical motor wired to household electrical voltage. The motion drive motor rotates the crank stud counterclockwise (facing from the grinder side toward the motor) at a certain number of revolutions per minute. In the present embodiment, the motion drive motor rotates the crank stud 64 at 150 revolutions per minute. The drive crank stud 64 is received in a slot 70 in the motion drive bracket 50.

FIG. 2 illustrates the continuous circulation of the grindstone in order to grind the entire surface of each tooth. This rotational pattern is repeated continuously to grind each tooth of the blade. Arrows 72 and 74 show arcuate, radial travel while arrow 76 shows a straight line travel.

FIGS. 3, 4, 5 and 6 illustrate the sequential movement of the grindstone to completely sharpen the entire surface of each tooth.

FIGS. 3, 4, 5 and 6 illustrate one complete rotation of the grindstone. Dashed line 78 show the rotational movement of the metal disk 60 and metal cap 62 as the motion drive motor 26 rotates the crank stud 64 which moves in the slot 70. This drives the motion drive bracket 50 in both straight line lateral motion and a radial, rocking motion. The inner "U" bracket 36 allows the motorized grinder 40 and the extending grindstone 44 to move in a straight line motion, the distance the bracket must travel for sharpening one tooth.

In FIG. 3, the grindstone is completed grinding tooth 78 and pulling the blade toward the brackets. This is the position 82 of the path.

Returning to a consideration of FIG. 3, as the variable throw crank 58 rotates the drive crank stud 64, the grindstone completes grinding tooth 78 and is lifted and moved forward. The inner "U" bracket is aligned with the outer "U" bracket 38 in an upright position.

Figure 4:
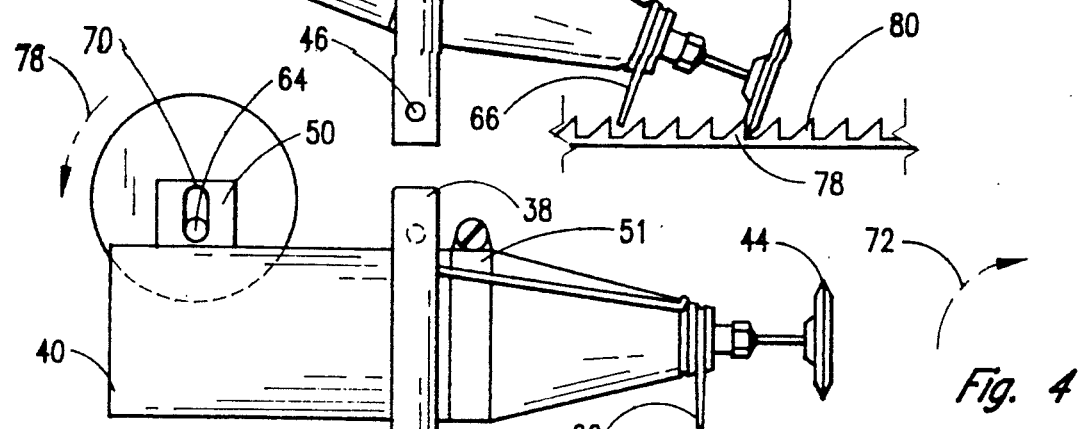

FIG. 4 illustrates the next step in the operation. As the variable throw crank 58 continues to rotate counterclockwise, the grindstone 44 will move forward and upward in a radial, arcuate pattern illustrated by arrow 72. The drive crank stud 64 likewise continues its rotational path. At the same time, the inner bracket swings about pins 46 and 48.

Figure 5:
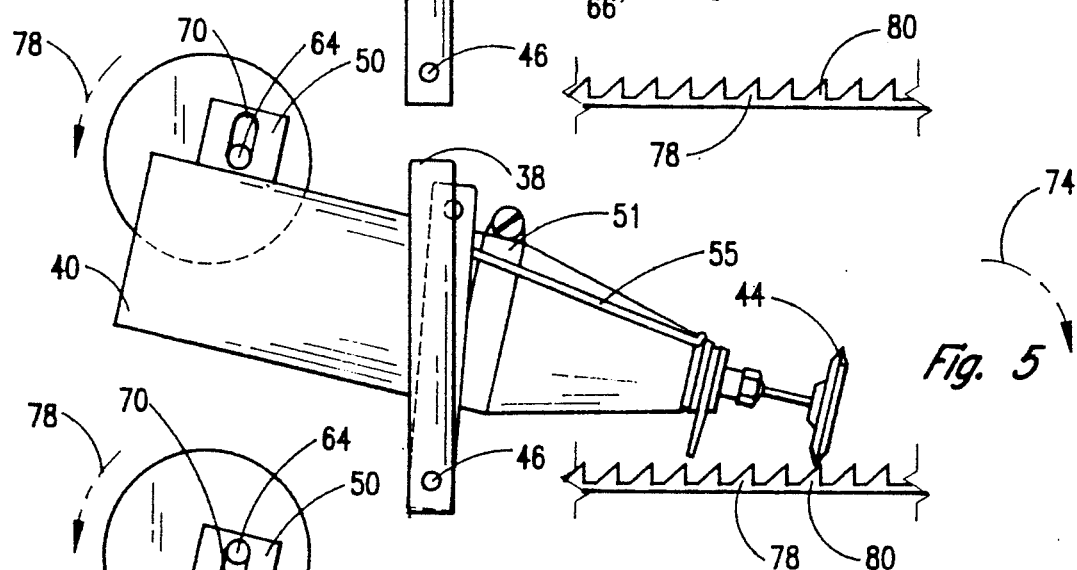

FIG. 5 illustrates the next step in the operation. As the variable throw crank 58 continues to rotate counterclockwise, the grindstone 44 will move forward and downward in a radial, arcuate pattern illustrated by arrow 74.

The drive crank stud 64 likewise continues its rotational path. The inner bracket continues to swing about pins 46 and 48. The grindstone, as it moves downward, comes in contact with the tip of the tooth 80 of the blade. The spring 55 provides a constant downward force of the grindstone against the blade.

Figure 6:
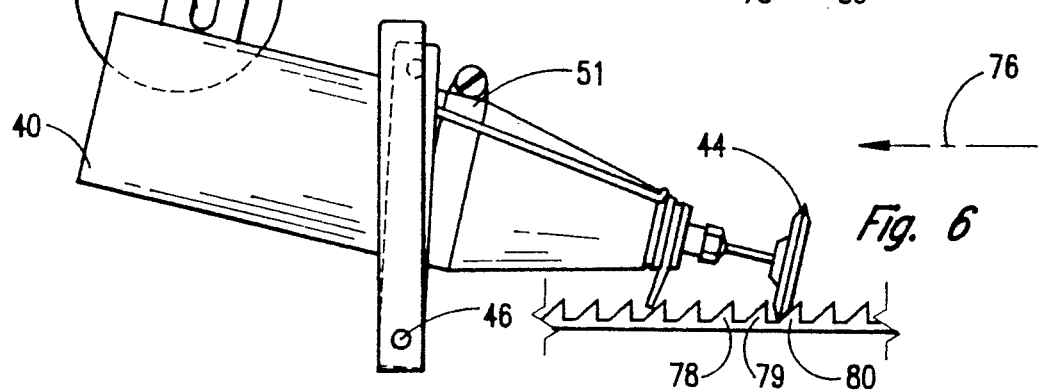

FIG. 6 shows the final step of the operation of the apparatus. While the variable throw crank 58 continues to rotate counterclockwise, the drive crank stud 64 rotates counterclockwise. At the same time, the crank stud is allowed to move within the slot. The slot provided in the bracket 50 allows the straight line movement of the grindstone 44, shown by arrow 76. The straight line movement 76 both grinds the tooth 80 and when contacting tooth 79 grinds and advances the blade. At the same time, the inner U-shaped bracket swings back toward alignment with the outer U-shaped bracket.

The process then begins again as shown in FIG. 3 and continues to the next tooth in succession.

Whereas, the present invention has been described in relation to the drawings attached hereto, it should be understood that other and further modifications, apart from those shown or suggested herein, may be made within the spirit and scope of this invention.

What is claimed is:

1. A saw blade sharpening apparatus for sharpening an elongated blade having a plurality of aligned cutting teeth, which apparatus comprises:
   grinding means to sharpen said teeth having a body and a rotating grindstone, said grindstone having an axis aligned with said blade;
   means to continuously circulate said rotating grindstone to move the grindstone across the surface of one of the teeth to grind the entire surface of said tooth; and
   means for said rotating grindstone to advance said blade linearly from said tooth being ground to the next tooth in succession.

2. A saw blade sharpening apparatus as set forth in claim 1 wherein said axis of said grindstone continuously circulates from a starting position, moves in a radial arc 180 degrees and then moves across the diameter of said radial arc to return to said starting point.

3. A saw blade sharpening apparatus as set forth in claim 2 wherein said rotating grindstone advances said blade linearly when said grindstone moves across the diameter of said radial arc.

4. A saw blade sharpening apparatus as set forth in claim 1 wherein said means to continuously circulate said rotating grindstone includes:
   a frame;
   pendulum means extending from said frame;
   drive bracket means connected to said body and pivotally connected to said pendulum; and
   drive crank means to drivingly engage said drive bracket; and
   motor means to move said drive crank means.

5. A saw blade sharpening apparatus as set forth in claim 4 wherein said drive bracket includes an elongated slot and said drive crank means includes an extending drive pin receivable in said slot.

6. A saw blade sharpening apparatus as set forth in claim 4 wherein said pendulum means includes a U-shaped bracket and said body is within said U-shaped bracket.

7. A saw blade sharpening apparatus as set forth in claim 1 including a pawl extending from said body and means to engage said pawl with one of said teeth behind said grindstone to advance said blade.

8. A saw blade sharpening apparatus as set forth in claim 1 including means to alter the angle of said axis of said grindstone to accommodate blades with differing rake angles.

9. A saw blade sharpening apparatus as set forth in claim 1 including a guide block having a slot therethrough for receiving said blade.

10. A saw blade sharpening apparatus as set forth in claim 1 wherein said rotating grindstone has a beveled edge.

* * * * *